United States Patent [19]

Kalfoglou

[11] Patent Number: 5,009,268
[45] Date of Patent: Apr. 23, 1991

[54] METHOD OF USING A COMBINATION LIGNOSULFONATE/POLYALKYLENE GLYCOL SYSTEM AS A SACRIFICIAL AGENT FOR SURFACTANT FLOODING

[75] Inventor: George Kalfoglou, Houston, Tex.
[73] Assignee: Texaco Inc., White Plains, N.Y.
[21] Appl. No.: 459,611
[22] Filed: Jan. 2, 1990
[51] Int. Cl.$^5$ .............................................. E21B 43/22
[52] U.S. Cl. ................................... 166/274; 166/275; 252/8.554
[58] Field of Search ............... 166/273, 270, 272, 274, 166/268, 275; 252/8.554

[56] References Cited

U.S. PATENT DOCUMENTS

| | | | |
|---|---|---|---|
| 3,897,827 | 8/1975 | Felber et al. | 166/270 |
| 4,172,497 | 10/1979 | Kalfoglou | 166/273 |
| 4,235,290 | 11/1980 | Kalfoglou | 166/273 |
| 4,236,579 | 12/1980 | Kalfoglou | 166/273 X |
| 4,249,606 | 2/1981 | Kalfoglou | 166/273 |
| 4,252,194 | 2/1981 | Felber et al. | 166/273 X |
| 4,267,886 | 5/1981 | Kalfoglou | 166/273 |
| 4,269,270 | 5/1981 | Kalfoglou | 166/273 |
| 4,275,789 | 6/1981 | Lawrence et al. | 166/270 X |
| 4,344,487 | 8/1982 | Kalfoglou | 166/273 X |
| 4,384,997 | 5/1983 | Detroit | 252/8.554 X |
| 4,452,308 | 6/1984 | Haskin et al. | 166/274 |
| 4,589,489 | 5/1986 | Volz et al. | 166/274 |
| 4,703,797 | 10/1987 | Djabbarah | 166/272 X |
| 4,793,419 | 12/1988 | Prukop et al. | 166/270 |

*Primary Examiner*—George A. Suchfield
*Attorney, Agent, or Firm*—Jack H. Park; Kenneth R. Priem; Harold J. Delhommer

[57] ABSTRACT

A sacrificial agent solution which is compatible with high molecular weight mobility control polymers for enhanced oil recovery, said solution comprising about 0.1% to about 5% by weight of a lignosulfonate and about 0.01% to about 5% by weight of a polyalkylene glycol having a relatively low molecular weight.

8 Claims, No Drawings

METHOD OF USING A COMBINATION LIGNOSULFONATE/POLYALKYLENE GLYCOL SYSTEM AS A SACRIFICIAL AGENT FOR SURFACTANT FLOODING

BACKGROUND OF THE INVENTION

This invention relates to a method of injecting chemicals into a hydrocarbon reservoir for the purpose of increasing hydrocarbon recovery. More particularly, the invention pertains to the use of a combination sacrificial agent system of lignosulfonate and polyalkylene glycol to decrease adsorption of surfactants within hydrocarbon reservoirs.

One of the most vexing problems in the use of surfactant flooding for enhanced oil recovery is the frequent, substantial loss of surfactant due to adsorption on the formation matrix and precipitation by polyvalent cations such as calcium and magnesium. A significant percentage of surfactants are also physically entrapped within the pore spaces of the rock matrix. Of chief concern is surfactant adsorption on the formation matrix which significantly decreases surfactant flood efficiency, making it necessary to inject a greater quantity of surfactant and increasing the cost of any surfactant flood.

Additionally, most surfactants are satisfactory for surfactant flooding only if the calcium and magnesium concentrations of the formation water fall below about 500 ppm. Petroleum sulfonates, the most popular type of surfactants, precipitate where divalent ion concentrations exceed about 500 ppm. Such precipitation renders the sulfonates inoperative for recovering oil and in some instances, causes formation plugging.

The main cause of surfactant loss is adsorption within the formation due to physical contact of the surfactant with the formation matrix or entrapment within pores of the matrix. Surfactant systems contacting a sandstone matrix encounter a range of adsorptive sites. Although a number of adsorptive sites in sandstone are negatively charged, there are also a number of positively charged sites. For example, the surfaces of clay platelets, which are invariably present in sandstone reservoirs, have negatively charged sites, and the edges of clay platelets have positively charged sites. The presence of small amounts of limestone or dolomite in sandstone will additionally introduce positively charged adsorptive sites.

The most promising approach for reducing the amount of surfactants retained by the formation matrix has been to use sacrificial agent compounds, either in a preflush solution injected before the surfactant-containing solution, or in the surfactant solution. The compounds are sacrificial in that their adsorption on the formation matrix and entrapment within the pore spaces of the formation reduces the loss of the more expensive surfactants, solubilizers and polymers contained within the surfactant solutions.

Various chemicals have been employed as sacrificial agents to decrease the adsorption of surfactants or to tie up polyvalent cations and prevent them from precipitating surfactants from the flooding medium. Lignosulfonates form one class of compounds which have been found to have excellent properties as sacrificial agents. They are economically attractive because they are by-products of the pulp industry. Supply is plentiful and product costs are much less than the costs of surfactants employed in enhanced oil recovery floods.

The use of various lignosulfonates has been disclosed extensively in the literature. U.S. Pat. Nos. 4,157,115 and 4,271,906 disclose several methods of using aqueous solutions of lignosulfonate salts as sacrificial agents. The use of oxidized lignosulfonates is disclosed in U.S. Pat. Nos. 4,133,385 and 4,196,777. Chrome lignosulfonates as sacrificial agents are described in U.S. Pat. No. 4,142,582. U.S. Pat. No. 4,172,497 discloses the use of lignosulfonates carboxylated with chloroacetic acid and U.S. Pat. No. 4,172,498 discloses sulfomethylated lignosulfonates as sacrificial agents. U.S. Pat. No. 4,479,542 describes a sacrificial afterflush method employing lignosulfonates.

U.S. Pat. Nos. 4,452,308 and 4,589,489 teach the use of polyalkylene glycols as sacrificial agents. Both patents discuss low molecular weight polyalkylene glycols having molecular weights below 1200. U.S. Pat. No. 4,627,494 discloses the use of a mixture of at least two sacrificial agents, wherein one sacrificial agent is a lignosulfonate and the second agent is an alkoxylated starch or cellulose.

Changes in surfactant flooding in the last decade have shown that mobility control polymers are required to improve the sweep efficiency, and thus the oil recovery efficiency, of a surfactant flooding system. U.S. Pat. No. 4,271,907 among others discloses the addition of a mobility control polymer to a surfactant system to increase oil recovery efficiency. However, mobility control polymers are incompatible with many sacrificial agent systems. For example, a mixture of alkoxylated cellulose or starch with high molecular weight mobility control polymers such as polysaccharides or polyacrylamides results in phase separation. Phase separation renders surfactant flooding systems useless for efficient oil recovery.

SUMMARY OF THE INVENTION

The disclosed invention is a sacrificial agent solution to be injected in an enhanced oil recovery operation, said solution comprising about 0.1% to about 5% by weight of a lignosulfonate and about 0.01% to about 5% by weight of a polyalkylene glycol. The polyalkylene glycol must have a relatively low molecular weight, preferably below about 2000.

The solution of sacrificial agents is injected into the formation to decrease the loss of more costly surfactant, solubilizer and polymer to the formation. The invention sacrificial agent system is preferably injected into the hydrocarbon formation in conjunction with the surfactant solution, but may also be injected prior to or after the injection of the surfactant system.

DETAILED DESCRIPTION

In carrying out the invention, a solution containing about 0.1% to about 5% by weight of a lignosulfonate, and about 0.01% to about 5% by weight of a polyalkylene glycol is injected as a combination sacrificial agent system through an injection means comprising one or more injection wells into a hydrocarbon formation. The sacrificial material is injected in a manner to occupy or cover substantially all potential adsorption or retention sites of the rock within the hydrocarbon formation, thereby reducing the extent of injected surfactant, solubilizer and polymer adsorption. The phrase "adsorption sites" of the matrix or formation rock is used to mean those portions of the formation rock surface, including matrix pores, which are capable of adsorbing or entrapping a chemical compound from a solution on contact.

The highly undesirable loss of surfactant in chemical flooding may generally be attributed to two main phenomena. The first phenomenon is chemical removal or inactivation of the surfactant after contact with polyvalent cations or other materials dissolved in the formation fluids. Frequently, the end result is precipitates which leave less surfactant in solution and which lower formation permeability. The second phenomenon is adsorption within the formation due to physical contact of the surfactant with the formation matrix or entrapment within pores of the matrix. It is believed that both phenomena exist simultaneously to varying degrees in most chemical flooding operations.

It is believed that sacrificial agents generally work by one or more of several chemical mechanisms. However, it must be emphasized that these chemical mechanisms are theoretical and the extent to which any one of these mechanisms may be responsible for the effectiveness of a sacrificial agent is unknown. One possible sacrificial mechanism is the complexing of the sacrificial agent with polyvalent cations in solution, both by neutral and by charged sacrificial complexing agents. To the extent that the sacrificial agent complexes with polyvalent cations in the formation fluids, there will be less polyvalent cations left for the surfactant to interact with.

A second possible mechanism is the electrostatic attraction of the matrix and the sacrificial agent for each other. This is predominantly controlled by the surface charge at the multitudes of matrix adsorption sites. The electrostatic attraction mechanism is highly dependent upon the composition of the formation matrix. For instance, sandstones which may contain many different types of clays, will have different types of attractions for sacrificial agents and surfactants.

A third possible sacrificial mechanism arises from the fact that polymers have many functional groups and may attach themselves to the rock surface at plural sites, thereby blocking access to other sites on which injected surfactants, solubilizers and polymers could adsorb. In this manner, the large size of polymer molecules may block entrances to very small pores where much of the surface area and many adsorption sites lie.

Furthermore, the character of the formation matrix, be it carbonate, bentonite, kaolinite or something between these three disparate types of substrates, also has a significant impact upon the effectiveness of the sacrificial material. Sacrificial agents which are highly effective in limestone reservoirs may be ineffective when employed in sandstone formations. Finally, the surfactant itself that is employed also alters adsorption, but it is generally not as critical as the type of formation matrix.

Various lignosulfonate derivatives have been employed as sacrificial agents in limestone floods. But due to the nature of their chemical structure, anionic lignosulfonates do not function as effectively as sacrificial agents in sandstone reservoirs because the primary minerals on which surfactants adsorb have a low point of zero charge. The adsorption sites in a sandstone matrix are not all of the same type. Although a large number of adsorptive sites in sandstone are negatively charged, there are also some positively charged adsorption sites. The sacrificial agent system employed should adsorb on both the negatively and positively charged adsorption sites in the matrix. Thus, the effectiveness of a sacrificial agent system can be increased by using a combination sacrificial agent system composed of more than one substance so that adsorption can take place both at negatively and positively charged sites. Such a flexible sacrificial agent system can be tailored to perform well for reducing adsorption on many different types of substrates.

The invention sacrificial agent system employs at least two sacrificial agents in a combination system, an anionic lignosulfonate and a polyalkylene glycol having a relatively low molecular weight. Several different lignosulfonate derivatives such as oxidized lignosulfonates, chrome lignosulfonates, carboxylated lignosulfonates and sulfomethylated lignosulfonates may be employed in the sacrificial system, but carboxylated lignosulfonates are preferred.

Lignosulfonates are anionic polyelectrolytes soluble in water and tolerant of hard water. They are thermally stable in formations where the temperature is high. Lignosulfonates are macromolecules built up by complex condensation of phenyl propane units. The sulfonate groups are attached to the aliphatic side chain. They are water soluble with molecular weights ranging from several thousand to about 50,000 or more.

The derivatives of sulfonated alkali lignins and sulfite lignosulfonates may be employed. Lignosulfonates having degrees of sulfonation from about 2.0 to saturation are acceptable as starting materials for the modified lignosulfonates employed in the combination sacrificial system. Cations which are acceptable include $Na+$, $K+$, $NH_4+$, $Ca++$ and $Mg++$. The degree of sulfonation is the weight percentage of sulfonate ($SO_3^-$) compared to the total molecular weight.

Crude unmodified lignosulfonates may be made with either softwoods or hardwoods. Although they have basically the same functional groups, the crude unmodified softwood lignosulfonates have more sulfonate and hydroxyl groups than the crude unmodified hardwood lignosulfonates. Thus, crude unmodified softwood lignosulfonates generally have better hard water tolerance than the hardwood lignosulfonates.

The sacrificial system is injected into the formation containing about 0.1% to about 5% by weight of a lignosulfonate, preferably, about 0.2% to about 4.0% by weight of a carboxylated lignosulfonate. Carboxylation of lignosulfonates is accomplished by reaction with reactants rich in carboxylated groups, such as chloroacetic acid.

This sacrificial system must also contain about 0.01% to about 5.0% by weight of a polyalkylene glycol, preferably about 0.1% to about 3.0% by weight of a polyalkylene glycol having a relatively low molecular weight below about 2000, most preferably below about 1200. Polyethylene glycol and polypropylene glycol are preferred. Higher molecular weight glycols must be avoided due to their tendency to cause phase separation in the presence of surfactant systems containing polysaccharides or polyacrylamides.

Preferably, the sacrificial agent system is coinjected into the subterranean formation in solution with the surfactant and solubilizer slug. The invention sacrificial agent system may also be injected prior to the injection of the surfactant system or after the injection of the surfactant system, but an injection in solution with the surfactant and polymer system or systems is preferred.

When a lignosulfonate is coinjected with a surfactant slug, the lignosulfonate molecules have a tendency to move ahead of the surfactant. It is believed that this tendency is due to the much larger size of the lignosulfonate molecules compared to the surfactant molecules. The larger lignosulfonates will pass up many of the smaller rock pores and the smaller surfactant molecules will interact more with the rock matrix. Thus, it may be desirable to inject some sacrificial agent immediately behind the surfactant as well as with the surfactant slug to insure that all of the surfactant slug is adequately protected by the sacrificial agent system.

When sacrificial agents are used in a preflush solution and injected prior to the surfactant system, the length of time before oil recovery is increased since the sacrificial agents will not recover any oil. Any extra time imposed by the flooding process before additional oil recovery may significantly reduce the overall economics of the process. In addition, preflushes in general are often not as effective as expected because of conformity problems and large reservoir volumes. There is no assurance that the flow path of the surfactant solution will sufficiently coincide with that of the preflush sacrificial agent solution.

The performance of postflushes of sacrificial agents may also suffer where a sacrificial agent solution is injected into the reservoir after the injection of the surfactant or polymer system. With a postflush injected after the surfactant system, less surfactant will generally be recovered from the formation because the surfactant system will have already occupied many of the adsorption sites in the matrix and the sacrificial agent will be unable to desorb surfactant and occupy as many adsorption sites as in a preflush or concurrent injection scheme.

Both the sacrificial agent system and the surfactant formulation may be injected into the subterranean hydrocarbon formation in an aqueous solution or a non-aqueous solution with a hydrocarbon solvent, depending upon other requirements. When the sacrificial agent system is injected in a mixture with the surfactant or micellar formulation, it is necessary that the admixture be phase stable. Chromatographic separation complications can be minimized by introducing the sacrificial agent system in both the surfactant slug and in the trailing mobility control polymer slug.

The quantity of sacrificial agent system to be injected should be sufficient to occupy or cover substantially all of the active adsorption sites of the formation matrix in order to achieve a maximum reduction in the amount of surfactant loss to the formation. If less than this optimum amount is used, the corresponding reduction and surfactant loss to the formation will not be as great as in the case where the formation adsorption sites were completely saturated. A balance must be struck with the economics of the surfactant flood. Of course, the use of excess sacrificial agent materials will substantially increase the cost of the chemical flood.

The preferred ratio of the lignosulfonate to the polyalkylene glycol and the total amount of sacrificial lignosulfonate and polyalkylene glycol system injected will vary with the mineral composition of the formation, the thickness of the formation, the pattern area to be swept and various other formation characteristics. Process design data coupled with field experience can determine the approximate quantity of sacrificial agent system needed for best results. But it should be noted that surfactant losses in the field have been found to be invariably higher than the projected losses from laboratory work. This is particularly so when the formation matrix contains large quantities of clays.

Thus, considerable knowledge of the formation matrix and formation fluids is necessary in order to determine the optimum amount of sacrificial agent system of lignosulfonate and polyalkylene glycol to be injected to achieve the maximum economical reduction in surfactant loss. If the hydrocarbon formation is relatively clean sandstone lacking substantial clay content, significantly smaller quantities of sacrificial agent will be needed than in the case where the formation contains large amounts of highly adsorbent clays.

The effectiveness of using a combination sacrificial agent system of a lignosulfonate and polyalkylene glycol for reducing surfactant, solubilizer and polymer loss in chemical flooding operations is demonstrated by the following examples. These examples are presented for illustrative purposes only and should not be construed to limit the scope of the invention, which is defined in the claims that follow.

EXAMPLES 1-4

The phase properties of combination sacrificial agent systems were investigated in the presence of two mobility control polymers, a polysaccharide and a polyacrylamide. The combination sacrificial agent system of U.S. Pat. No. 4,627,494 was contrasted with the present invention.

Stock solutions of the sacrificial agents and mobility control polymers were prepared in a 67,000 ppm TDS brine containing about 3300 ppm divalent ions. The stock solutions were mixed according to Table 1 in graduated tubes at 25° C. and allowed to stand.

Starsweep 1400 is a trademarked partially hydrolyzed polyacrylamide having a molecular weight of about 14 million sold by Texas Specialty Chemicals. Flocon 4800 is a trademarked polysaccharide having an approximate molecular weight of 5 million sold by Pfizer Inc. Klucel H is a trademarked propoxylated cellulose sold by Hercules Inc. having a molecular weight of approximately 300,000. Lignosite 458 is a trademarked sodium lignosulfonate sold by Georgia Pacific Inc. having a molecular weight of about 50,000. PEG 1000 is polyethylene glycol having a molecular weight of about 1000.

TABLE 1

| Ex. | | Starsweep 1400 (1000 ppm) | Flocon 4800 (1000 ppm) |
| --- | --- | --- | --- |
| 1 | 1% Klucel H | Two Phases | Two Phases |
| 2 | 1% Klucel H and 1% Lignosite 458 | Two Phases | Two Phases |
| 3 | 1% PEG | One Phase | One Phase |
| 4 | 1% PEG and 1% Lignosite 458 | One Phase | One Phase |

Examples 1-4 in Table 1 indicate that the combination sacrificial agent system of U.S. Pat. No. 4,627,494 fails in the presence of a polysaccharide or polyacrylamide due to phase separation. The formation of two separate and distinct phases would break up a surfactant system resulting in inefficient oil recovery. A comparison of Examples 1, 2 and 4 indicate that the phase separation is due to the cellulose component, Klucel H. Additional testing indicated that larger molecular weight and polymer like characteristics of the cellulose interacts with the mobility control polymers to cause phase separation. Consequently, it is important to use a relatively low molecular weight polyalkylene glycol in combination with the lignosulfonate.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from a subterranean hydrocarbon formation which is penetrated by at least one injection well and at least one production well wherein a surfactant system is injected into the formation to sweep oil through the formation to at least one production well, which comprises:

injecting into the formation a surfactant solution containing about 0.11% to about 10% by weight of a mixture of at least two sacrificial agents designed to prevent the loss to the formation of injected chemicals of a surfactant solution, said mixture of at least two sacrificial agents comprised of about 0.1% to about 5% by weight of a lignosulfonate and about 0.01% to about 5% by weight of a polyalkylene glycol having a molecular weight less than about 2000.

2. The method of claim 1 wherein said injected chemicals of a surfactant solution are selected from the group consisting of surfactants, solubilizers, sulfonates, and polymers.

3. The method of claim 1, wherein the mixture of sacrificial agents is injected into the formation prior to the injection of a surfactant solution.

4. The method of claim 1, wherein the mixture of sacrificial agents is injected into the formation after the injection of a surfactant solution.

5. The method of claim 1, wherein the mixture of sacrificial agents is injected into the formation in solution with said injected chemicals and after the injection of a surfactant solution.

6. The method of claim 1, wherein about 0.005 to about 0.4 pore volumes of solution containing a sacrificial agent is injected into the formation.

7. The method of claim 1, wherein the polyalkylene glycol is polyethylene glycol, polypropylene glycol, or a mixture.

8. A method of recovering hydrocarbons from a subterranean hydrocarbon formation which is penetrated by at least one injection well and at least one production well, wherein a surfactant system is injected into the formation to sweep oil through the formation to at least one production well, which comprises:

injecting into the formation a surfactant solution comprising about 0.2% to about 4% by weight of a carboxylated lignosulfonate, and about 0.1% to about 3.0% by weight of a polyalkylene glycol having a molecular weight less than about 1200.

* * * * *